United States Patent [19]

Fujita et al.

[11] Patent Number: 4,691,786

[45] Date of Patent: Sep. 8, 1987

[54] BOLT-NUT TIGHTENING DEVICE HAVING MEANS FOR PREVENTING ABNORMAL ROTATION

[75] Inventors: Masahiro Fujita, Sennan; Yukio Uemura, Yokohama, both of Japan

[73] Assignees: Maeda Metal Industries Ltd., Osaka; Nissan Motor Co., Ltd., Kanagawa, both of Japan

[21] Appl. No.: 879,520

[22] Filed: Jun. 27, 1986

Related U.S. Application Data

[63] Continuation of Ser. No. 624,174, Jun. 25, 1984, abandoned.

[30] Foreign Application Priority Data

Jun. 30, 1983 [JP] Japan .......................... 58-102303[U]

[51] Int. Cl.4 ............................................... B23Q 5/00

[52] U.S. Cl. ......................................... 173/12; 74/789

[58] Field of Search ...................... 173/12; 81/56, 474; 74/768, 789, 740, 750 K, 752 E, 752 F

[56] References Cited

U.S. PATENT DOCUMENTS

| | | | |
|---|---|---|---|
| 2,857,786 | 10/1958 | Reeber | 74/789 X |
| 3,527,121 | 9/1970 | Moore | 74/801 |
| 3,739,888 | 6/1973 | Brady | 74/789 X |
| 3,939,736 | 2/1976 | Morin | 74/801 |
| 4,133,344 | 1/1979 | Hunter et al. | 74/768 X |
| 4,187,740 | 2/1980 | Silvestri | 74/750 R |
| 4,215,594 | 8/1980 | Workman, Jr. | 173/12 X |
| 4,403,529 | 9/1983 | Ikeda et al. | 81/56 |
| 4,513,827 | 4/1985 | Dubiel | 173/12 |

*Primary Examiner*—E. R. Kazenske
*Assistant Examiner*—Willmon Fridie, Jr.

[57] ABSTRACT

A bolt-nut tightening device comprising an epicyclic train including a tubular internal gear case and a planet gear support frame, an outer socket coupled to the gear case, an inner socket connected to the support frame and a one-way rotation permitting member provided between the gear case and the main body of the device for preventing the two sockets from rotating at a high speed in the same direction.

4 Claims, 6 Drawing Figures

BOLT-NUT TIGHTENING DEVICE HAVING MEANS FOR PREVENTING ABNORMAL ROTATION

This application is a continuation of application Ser. No. 624,174 filed June 25, 1984 now abandoned.

TECHNICAL FIELD

The present invention relates to a device for tightening up a nut on a bolt, and more particularly to a bolt-nut tightening device having means for preventing an inner socket and an outer socket from abnormal rotation, i.e. from rotating at a high speed in the same direction.

BACKGROUND ART

Tightening devices of this type usually comprise an epicyclic train coupled to a drive assembly and having a planet gear support frame and an internal gear. An inner socket and an outer socket are connected to the frame and the gear, resectively, such that a nut can be tightly screwed on a bolt by the reaction of rotation acting on the two sockets.

However, if the bolt or the nut is provided with a friction member in between for preventing loosening or if there is deformation or a flaw on the bolt which prevents smooth rotation of the nut and when the tightening device is brought into operation before the nut comes into intimate contact with the workpiece P as seen in FIG. 6, it is likely that the bolt and the nut rotate together, permitting the outer socket 71 and the inner socket 8 to rotate at a high speed in a direction opposite to the nut tightening direction without slowing down to surprise the operator. This is attributable to the absence of the reaction of rotation that otherwise would act between the inner socket and the outer socket, in which case the internal gear, sun gear and planet gears fail to rotate relative to one another, allowing the epicyclic train to rotate in its entirety at the speed of rotation of the sun gear without operating as designed.

SUMMARY OF THE INVENTION

An object of the present invention is to provide a bolt-nut tightening device wherein the internal gear has connected thereto a member for permitting the internal gear to rotate only in one direction, i.e. in the nut tightening direction.

More specifically an object of the invention is to provide a bolt-nut tightening device comprising an epicyclic train including a tubular internal gear case and a planet gear support frame, an outer socket coupled to the gear case, an inner socket connected to the support frame and a one-way rotation permitting member for preventing the two sockets to rotate at a high speed in the same direction.

Since the sun gear and the internal gear of the epicyclic train are in opposite relationship in the direction of rotation, it is possible to prevent the epicyclic train assembly from rotating at a high speed in the direction of rotation of the sun gear by preventing reverse rotation of the internal gear.

DETAILED DESCRIPTION OF THE INVENTION

Figures 1, 6:
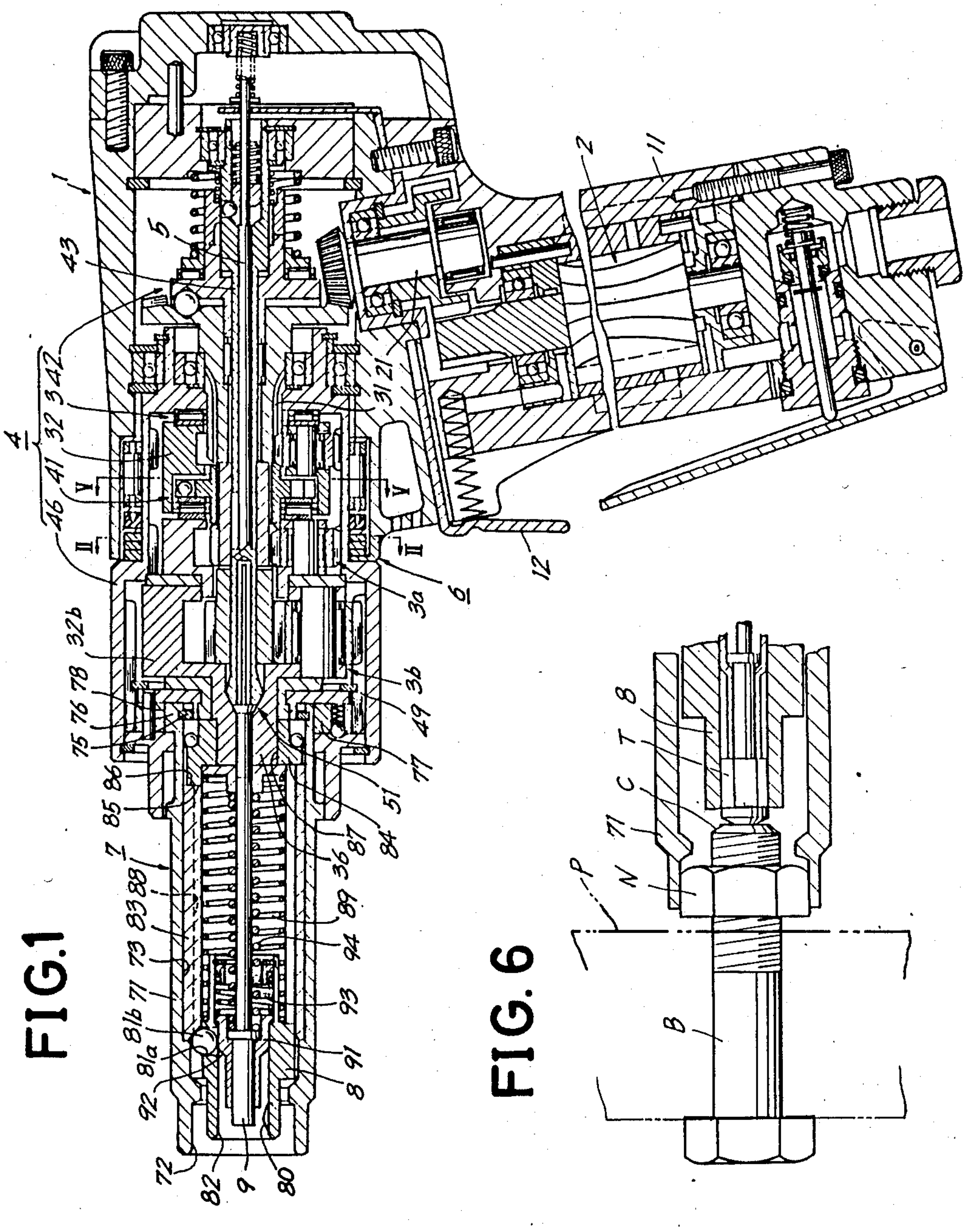
FIG. 1 is a sectional view showing a tightening device of the prsent invention.
FIG. 6 is a sectional view showing the tightening device in engagement with a bolt and a nut.
Figure 2:
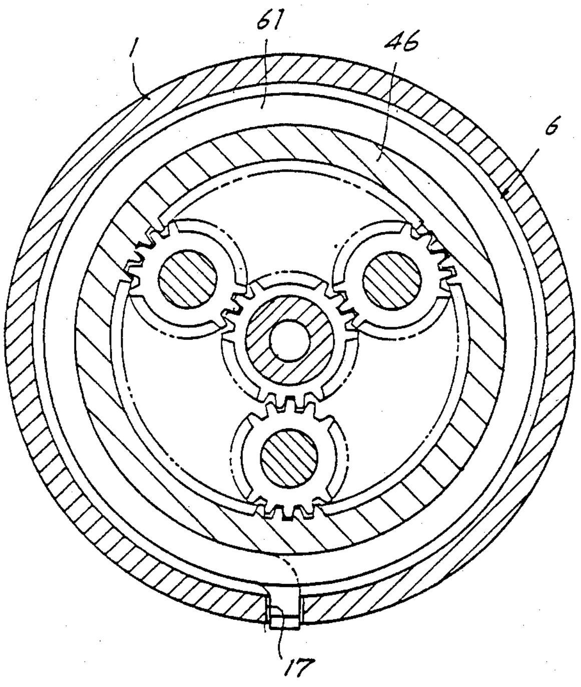
FIG. 2 is a view in section taken along the line II—II in FIG. 1.
Figure 3:
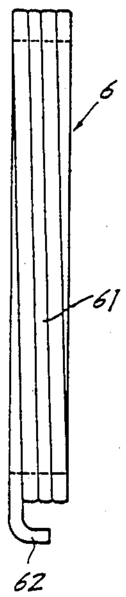
FIG. 3 is a side elevation showing a one-way rotation permitting member.

The present invention will be described below in detail with reference to the embodiment shown in the drawings.

The tightening device illustrated is adapted to tighten up a nut N on a bolt B having a tip T which is to be snappped off from the forward end of its shank as seen in FIG. 6. The tip is snapped off when subjected to a fastening or tightening force in excess of a predetermined torque. Thus the bolt and nut can be tightened up properly with the predetermined torque.

The tightening device comprises a housing 1 including a grip portion 11, a drive assembly 2, such as an air motor, housed in the grip portion 11, a speed change assembly 4 projecting outward from the front end opening of the housing 1, a socket unit 7 removably connected to the speed change assembly 4, and a one-way rotation permitting member 6 connected to a tubular internal gear case 46 of the speed change assembly 4.

The drive assembly 2 is coupled to the speed change assembly 4 through a transmission shaft 21.

The components of the tightening device will be described below.

Speed change assembly

The speed change assembly 4 comprises first, second and third epicyclic trains 3, *3a* and *3b* connected to one another in series and housed in the gear case 46 which is rotatably fitted in the front end opening of the housing 1. The first epicyclic train 3 includes a planet gear support frame 32 which is coupled to the sun gear 31*a* of the second epicyclic train *3a* by a one-way clutch 41 for rotating the sun gear 31*a* in preference. The second epicyclic train *3b* includes a planet gear support frame 32*a* which is splined as at 34 to the sun gear 31*b* of the third epicyclic train *3b*.

The epicyclic trains 3, *3a*, *3b* include planet gears 33, 33*a*, 33*b* in mesh with internal teeth 47, 48, 49 on the inner side of the gear case 46. The sun gear 31 of the first epicyclic train 3 is coupled to the transmission shaft 21.

A clutch shaft 43 rotatably extends through the first sun gear 31 independently of the rotation of the gear 31 and has a front end fitting in a polygonal bore 35 of the second sun gear 31*a*. The clutch shaft 43 has a rear end which is releasably coupled to the first sun gear 31 by a clutch 42.

Figure 5:
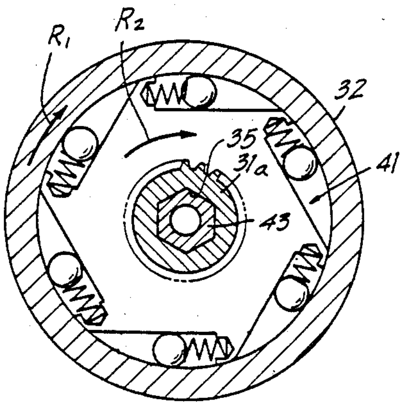
FIG. 5 is a view in section taken along the line V—V in FIG. 1.
Figure 4:
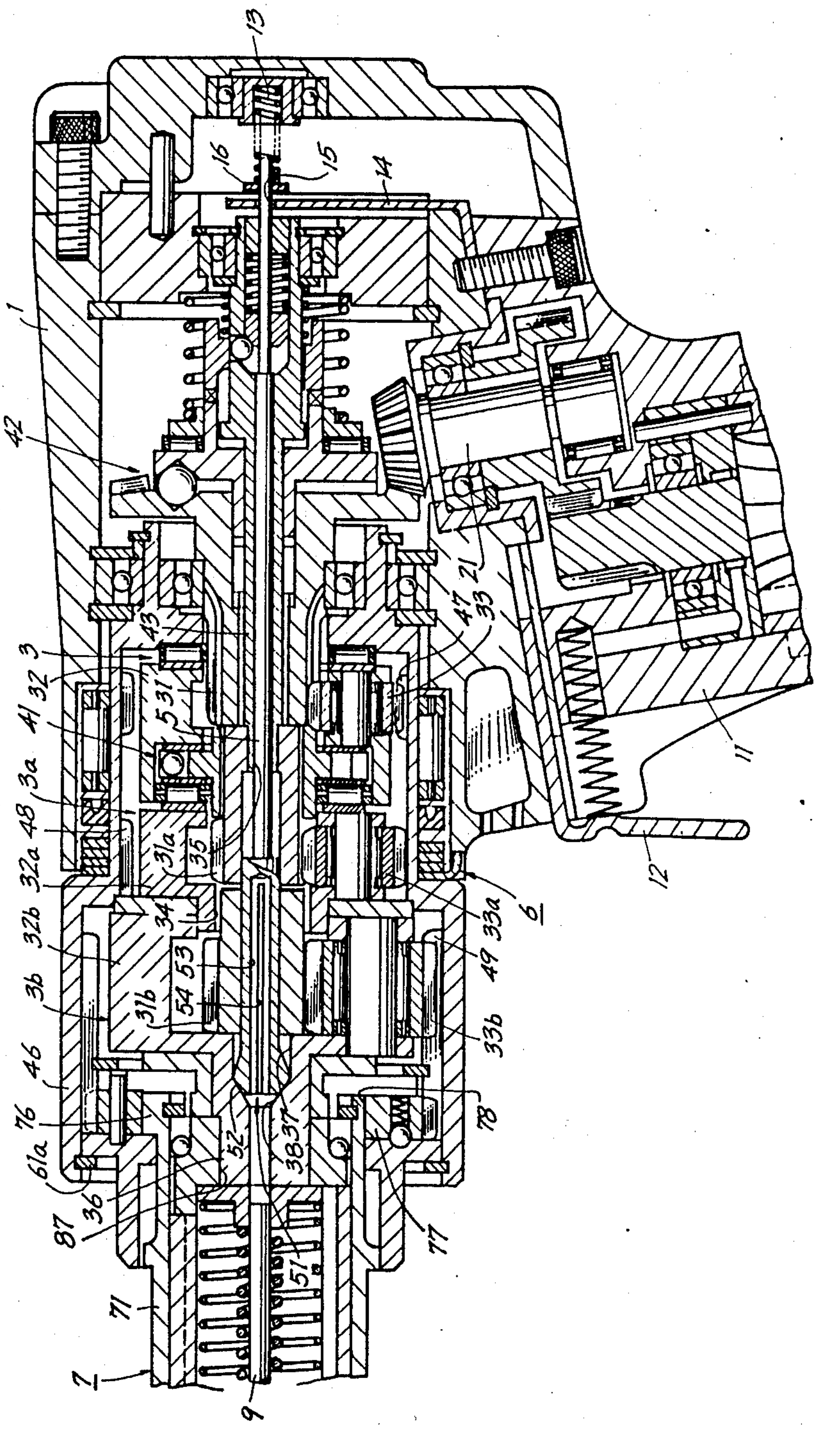
FIG. 4 is a sectional view showing a speed change assembly.

The clutch 42 is automatically disengaged when the clutch shaft 43 is loaded. While the clutch 42 is engaged directly coupling the clutch shaft 43 to the first sun gear 31, the support frame 32 is rotated by the first epicyclic train 3 at a reduced speed in the direction, of arrow $R_1$ in FIG. 5, while the second sun gear 31*a* is directly driven in the direction of arrow $R_2$ by shaft 43. While the speed change assembly 4 is unloaded and clutch 42 is engaged, $R_2 > R_1$, and the shaft 43 rotates independently relative to the support frame 32 which idlely rotates 31*a*. The sun gear 31 rotates with the shaft 43 at a speed of $R_2$.

When the clutch 42 is automatically disengaged by a load acting on the speed change assembly 4, rendering the shaft 43 free to rotate, i.e. making $R_2$ equal $R_1$, the first support frame 32 drives the second sun gear 31*a* at a reduced speed $R_1$ through the action of the one-way clutch 41.

The support frame 32*b* of the third epicyclic train 3*b* has a polygonal shaft portion 36 in alignment with the sun gear 31*b* thereof. A clamp shaft 5 extending through the sun gears 31*a*, 31*b* and the clutch shaft 43 is rotatable relative thereto and slidable axially thereof. The shaft 5 has a diametrically enlarged front end to provide a clamp portion 51 opposed to the ejector pin 9 to be described later. The shaft 5 has a rear end of reduced diameter which has a trigger lever 12 connected thereto and is biased forward by a spring 13.

The lever 12 is formed from a metal strip by bending, being bent in an arcuate form within the grip portion 11 to clear the transmission shaft 21 and further bent upward to provide a base end. The clamp shaft 5 extends through a hole 15 formed in the upper end of the bent portion 14.

The clamp shaft 5 is provided with a snap ring 16, which engages with the lever 12 when the lever 12 is pulled.

The internal gear case 46 has connected thereto the aforementioned one-way rotation permitting member 6 which is characteristic of the present invention.

One-way rotation permitting member

The one-way rotation permitting member 6 is adpated to permit the gear case 46 to rotate only in the direction in which the nut N is to be tightened.

According to the present embodiment, a spring wire 61 is wound around the gear case 46 a plurality of turns in a direction opposite to the nut tightening direction. One end of the spring wire 61 is bent as at 62 and is engaged in a cutout 17 in the housing 1.

When the internal gear case 46 rotates in the nut tightening direction which is the spring loosening direction, the spring wire 61 permits free rotation of the internal gear case 46, whereas when the gear case 46 starts to rotate in the oposite direction, the spring wire 61 tightly fits around the case 46 in frictional contact therewith, thus preventing reverse rotation of the case 46.

Socket unit

The socket unit 7 removably attached to the gear case 46 and the support frame 32*b* of the third epicyclic train 3*b* comprises an outer socket 71 coaxially formed with a channel 73 extending therethrough and a nut engaging bore 72 at its front end. Freely rotatably provided in the interior of the outer socket 71 are an inner socket holder 83 and a transmission tube 84 which is prevented from slipping off by a snap ring 75, and disposed at the base end of the holder 83.

The outer socket 71 is formed at its base end with a polygonal flange 76 fitting in a polygonal hole 78 in a gear 77 meshing with teeth 49 of the internal gear case 46. Thus, the outer socket 71 is rotatable with the internal gear case 46.

The inner socket holder 83 and the transmission tube 84 have toothed ends 85 and 86 opposed to and meshing with each other.

The tube 84 is coaxially formed with a polygonal bore 87 having fitted therein the polygonal shaft portion 36 of the support frame 32*b* of the third epicyclic train 3*b*.

The inner socket holder 83 is internally formed with axial spline grooves 88. An inner socket 8 is slidable in engagement with the grooves 88. Accordingly the inner socket 8 is made rotatable with the support frame 32*b* of the third epicyclic train 3*b* by the holder 83 and the transmission tube 84.

The inner socket 8 has at its front end a bolt tip engaging bore 82 and is biased forward by a spring 89. The engaging bore 82 is provided with a plate spring 80 for preventing the bolt tip T from spontaneously falling off after the tip T has been snapped off. The force of the spring 80 is such that the spring can retain the bolt tip against gravity while permitting the discharge of the tip without trouble as will be described later.

The inner socket 8 is provided with known incomplete fitting prevention means.

To provide the prevention means, a hole 81*a* is formed in the tubuar wall of the inner socket 8. A ball 81*b* rollably fitted in the hole 81*a* has such a size as to project outward from the tubular wall. A tip insertion recognizing tube 91 is slidably fitted in the inner socket 8.

The insertion recognizing tube 91 has a small-diameter front portion and a large-diameter rear portion, with a tapered stepped portion 92 formed therebetween, and is biased toward the front end of the outer socket 71 by a spring 93. The ball 81*b* is pushed up outward by the large-diameter portion of the tube 91 into contact with the front end of the inner socket holder 83, whereby the inner socket 8 is prevented from retraction.

The socket unit 7 has the ejector pin 9 slidably extending through the recognising tube 91. The ejector pin 9 is biased outward by a spring 94 and has a front end projecting beyond the tube 91 and a base end extending to a position close to the polygonal shaft portion 36 of the support frame 32*b*.

The clamp shaft 5 has at its front end a clamp portion 51 for disengageably supporting the ejector pin 9.

Clamp portion

The front end of the clamp shaft 5 is formed with a tapered face 53 and fitted in a base-end large-diameter portion of a stepped axial bore 37 extending through the support frame 32*b* of the third epicyclic train.

The stepped portion of the axial bore 37 is defined by a tapered face 38 corresponding to the tapered face 52 of the clamp shaft 5.

The clamp shaft 5 is coaxially formed with an axial bore 53 which is opened at its front end and has slits 54 in communication with the axial bore 53.

The clamp shaft 5 is spring-biased toward the outer socket 71 into contact with the tapered face 38 defining the axial bore 37 of the support frame 32*b*, whereby the axial bore 53 is diametrically contracted.

When the lever 12 is pulled to rearwardly move the clamp shaft 5 against the spring 13 away from the tapered face 38 of the bore 37, the slits 54 and the axial bore 53 are enlarged to permit entry of the ejector pin 9.

The tightening device described above operates in the following manner.

Engagement of bolt and nut

A nut is first loosely screwed on a bolt manually.

With the device placed on the bolt, the bolt tip T is fitted into the tip engaging bore 82.

At this time, the ejector pin 9 and the insertion recognizing tube 91 within the socket 8 retract against the springs 93 and 94. When the bolt tip T has completely fitted into the bore 82, the ball 81*b* of the incomplete fitting prevention means falls from the tapered portion 92 of the tube 91 onto the small-diameter portion, permitting retraction of the inner socket 8 from the nut engaging bore 72 of the outer socket 7. The nut N therefore fits into the bore 72.

At this time, the ejector pin 9 rearwardly pushes the clamp portion 51 of the clamp shaft 5, moving the tapered face 52 of the clamp portion 51 away from the tapered face 38 of the support frame 32*b*. This enlarges the axial bore 53 of the clamp portion 51, allowing the rear end of the ejector pin 9 to advance into the enlarged axial bore 53, whereby the shaft 5 has its tapered face 52 brought into contact with the tapered face 38 of the support frame 32*b* again by the action of the spring 13. Consequently the axial bore 53 is diametrically contracted for the clamp portion 51 to clamp the ejector pin 9.

Tightening

When the drive assembly 2 is operated, the differential gear mechanisms provided by the first and third epicyclic trains 3, 3*a* and 3*b* cause the tubular internal gear case 46 and the support frame 32*b* to produce torques acting in opposite directions. With the bolt tip T held by the inner socket 8, the outer socket 71 rotates the nut N at a relatively high speed to screw the nut on the bolt.

If the nut is tightly fitted to the bolt with a loosening preventing friction member provided therebetween and if a conventional device is initiated into operation for tightening before the nut comes into intimate contact with the workpiece P, the inner socket 8 and the outer socket 71 are likely to rotate together at a high speed in a direction opposite to the nut tightening direction, whereas the device of the invention is entirely free of such trouble because the gear case 46 for driving the outer socket is prevented from reverse rotation by the one-way rotation permitting member 6, thus eliminating the likelihood that the gear case 46 will rotate in the same direction as the sun gear 31*b*, that is, the components of the epicyclic train will rotate together as a unit.

Further even if the thread ridges of the nut or the bolt are partly damaged to permit the nut to rotate with the bolt during tightening, it is unlikely that the outer socket and the inner socket will rotate together in the same direction to surprise the operator.

Tightening up and shearing

When the nut is tightly screwed on the bolt, abruptly increasing resistance acts on the rotational drive system, automatically disengaging the clutch 42 and interrupting transmission of rotation from the first sun gear 31 to the clutch shaft 43. On the other hand, the rotation of the support frame 32 of the first epicyclic train 3 at the reduced speed $R_1$ is delivered to the first sun gear 31 via the one-way clutch 41.

The rotation of the first sun gear 31 is smaller in number of revolutions but greater in torque by an amount corresponding to the speed reduction achieved by the first epicyclic train 3, than the resistance-free rotation in the initial stage of tightening described.

The increased tightening torque is delivered to the inner socket 8 and the outer socket 71. At the ultimate stage of bolt-nut tightening, the torque causes stress concentration on the grooved portion C of the bolt for snapping off the tip T, whereby the tip T is sheared. This assures that the nut is tightened up on the bolt with a specified torque value.

Discharge of tip and return of parts

After tightening up, the cut-off bolt tip T remains in the inner socket 8 as retained by the plate spring 80. When the entire device is moved away from the nut N, the inner socket 8 is advanced into the nut fitting portion of the outer socket 71 and returned to its original position by the inner socket spring 89.

At this time, the ejector pin 9 remains in its retracted position as clamped by the clamp portion 51 of the clamp shaft 5.

When the lever 12 is pulled to retract the shaft 5 and move the tapered face 52 of the shaft 5 away from the tapered face 38 of the support frame 32*b*, the axial bore 53 of the shaft 5 enlarges to release the ejector pin 9 from the clamp portion 51, whereupon the ejector pin 9 is forced forward by the spring 94 to throw out the bolt tip T.

Because the device of the present invention is provided with means for preventing reverse rotation of the gear case 46 and the outer socket 71, it is unlikely that the outer socket 71 and the inner socket 8 will rotate together at a high speed in the nut loosening direction to surprise the operator.

The embodiment described is not limitative but can of course be modified variously within the scope of the invention defined in the appended claims.

What is claimed is:

1. A device for securing a fastener with a nut, said fastener having a head, a threaded shank and a sheer-off tip of polygonal cross section, said device comprising;
   (a) a housing;
   (b) a motor controlled by a switch means;
   (c) an epicyclic gear train in said housing and including a tubular internal gear case, a sun gear driven by said motor and a planet gear support frame having planet gears in constant mesh with said sun gear and said tubular internal gear case;
   (d) means between said tubular gear case and said housing for preventing the rotation of said tubular internal gear case in the nut loosening one direction;
   (e) an outer nut engaging socket connected to and driven by said tubular gear case in a direction for tightening said nut on said threaded shank; and
   (f) an inner tip engaging socket connected to the planet gear support frame and driven in a direction opposite to the direction of said outer nut engaging socket;

wherein said means between said tubular gear case and said housing for preventing the rotation of said tubular internal gear case in said nut loosening one direction prevents abnormal rotation of the tubular internal gear case integrally together with and in the same direction as the inner socket.

2. A bolt-nut tightening device as defined in claim 1 wherein said means for preventing rotation comprises a spring wire having a bent end.

3. A bolt-nut tightening device as defined in claim 1 wherein said means for preventing rotation comprises a spring wire having one end engaged with said housing and wound around said gear case a plurality of turns in a direction opposite to said nut tightening direction.

4. A bolt-nut tightening device as defined in claim 1 wherein said means for preventing rotation comprises a spring wire tightly fitted around said gear case in frictional contact therewith when said gear case starts to rotate in a direction opposite to said nut tightening direction.

* * * * *